United States Patent [19]
Wilson

[11] Patent Number: 5,967,182
[45] Date of Patent: Oct. 19, 1999

[54] OUTSIDE FILTER FOR FLUSH VALVE

[75] Inventor: John R. Wilson, Naperville, Ill.

[73] Assignee: Sloan Valley Company, Franklin Park, Ill.

[21] Appl. No.: 08/964,002

[22] Filed: Nov. 4, 1997

[51] Int. Cl.⁶ .................................................. F16K 31/145
[52] U.S. Cl. ............................................. 137/544; 251/40
[58] Field of Search ................................ 251/40; 137/544

[56] References Cited

U.S. PATENT DOCUMENTS

| | | | |
|---|---|---|---|
| 1,257,231 | 2/1918 | Hill | 137/544 |
| 5,150,877 | 9/1992 | Whiteside et al. | 251/40 |
| 5,332,192 | 7/1994 | Whitesisde | 251/40 |

FOREIGN PATENT DOCUMENTS

| | | | |
|---|---|---|---|
| 286831 | 3/1928 | United Kingdom | 137/544 |
| 1 410 753 | 10/1975 | United Kingdom . | |

*Primary Examiner*—A. Michael Chamber
*Attorney, Agent, or Firm*—Dorn, McEachran, Jambor & Keating

[57] ABSTRACT

A diaphragm type of flush valve for use with toilet devices such as urinals and water closets includes a body having an inlet and an outlet. There is a valve seat between the inlet and outlet and a valve member is movable to a closing position on the valve seat to stop flow between the inlet and outlet. The valve member includes a diaphragm assembly peripherally attached to the body. There is a pressure chamber above the diaphragm assembly for holding the valve member on the valve seat. A filter and bypass orifice in the diaphragm assembly connects the inlet and the pressure chamber. The filter includes a circumferential filter ring attached to the underside of the diaphragm and positioned adjacent its periphery. The ring has a plurality of circumferentially spaced filter grooves in communication with the inlet. There is a peripheral channel connecting the grooves and there is an orifice in communication with the peripheral channel and the plurality of grooves to provide a water flow conduit between the inlet and the pressure chamber.

43 Claims, 6 Drawing Sheets fig.12.

OUTSIDE FILTER FOR FLUSH VALVE

FIELD OF THE INVENTION

Diaphragm-type flush valves for use on toilet devices such as urinals and water closets have conventionally had a filter and a bypass orifice to connect the flush valve inlet with the pressure chamber above the diaphragm. The purpose of the filter and the bypass is to provide a water passageway of limited size to permit the pressure chamber to fill insuring closure of the flush valve by movement of the diaphragm onto its valve seat. There have been numerous prior art disclosures relating to the filter and the diaphragm. One such is shown in U.S. Pat. No. 5,332,192, assigned to the assignee of the present application, Sloan Valve Company of Franklin Park, Ill. The prior art listed therein also show many forms of diaphragm filters and bypass orifices.

The present invention is specifically directed to an improvement in this portion of the diaphragm and more specifically to an improved diaphragm, which places the filter and the bypass orifice adjacent the diaphragm periphery. Such placement provides improved communication through the filter thus insuring that the flush valve will close in a consistent manner to limit water flow through it to a predetermined volume as now mandated by many federal and state regulations.

Further, the use of the present filter and bypass orifice construction in the diaphragm eliminates the need for the embedded metal or brass segments customarily found adjacent the diaphragm periphery.

The diaphragm filter and bypass orifice are located at the periphery of the diaphragm and are formed by a plastic ring which fits on the underside of the diaphragm and in two embodiments of the invention cooperates with an orifice member, which may be a partial or a complete ring, and which is located on the upper side or pressure chamber side of the diaphragm. The cooperation of these two rings and the rubber material of the diaphragm permit a reliable filter and bypass orifice assuring unclogged communication between the flush valve inlet and its pressure chamber and assuring water flow at a predetermined rate which will insure flush valve closure at the required time for consistent operation.

SUMMARY OF THE INVENTION

The present invention relates to flush valves for use on urinals and water closets and more specifically to an improved filter and bypass orifice for a flush valve.

A primary purpose of the invention is a diaphragm for the use described in which the filter and bypass orifice are located adjacent the periphery of the diaphragm, rather than near the center or middle of the diaphragm as has been customary in prior art devices.

Another purpose of the invention is a diaphragm as described in which the filter is formed by a plastic ring positioned on the underside of the diaphragm and having a plurality of generally uniformly spaced filter grooves formed therein.

Another purpose of the invention is a diaphragm as described which includes non-metallic rings placed on the opposite sides of the diaphragm and cooperating to form both a bypass and a filter to connect the flush valve inlet and its pressure chamber.

Another purpose is a flush valve diaphragm for the use described in which the filter and bypass orifice reliably provide a consistent and measured volume of water flow between the flush valve inlet and its pressure chamber.

Another purpose is a flush valve diaphragm as described in which the filter ring functions both as a filter and as a portion of the diaphragm bypass orifice.

Another purpose of the invention is to provide a diaphragm assembly as described in which the upper orifice member on the diaphragm may be either a complete ring or an arcuate segment.

Another purpose is a diaphragm assembly as described which may be used with a manually-operated flush valve, a solenoid-operated flush valve and other types of valves using a diaphragm assembly as a valving mechanism.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention describes several embodiments of a diaphragm assembly for a flush valve. In a first embodiment, the diaphragm includes the customary rubber or rubberlike member with a filter ring attached to the bottom thereof adjacent the diaphragm periphery to provide filter passages and an orifice member placed on the top of the diaphragm to complete the bypass orifice through the diaphragm assembly. In the first embodiment, the orifice member is a complete ring. In a second embodiment, the principal difference is that the orifice member rather than being a complete circular element, is a partial arcuate extent. In a third embodiment of the invention, the bottom filter ring functions as both the filter member and the orifice member. Further embodiments show modifications of the filter ring.

Figure 1:
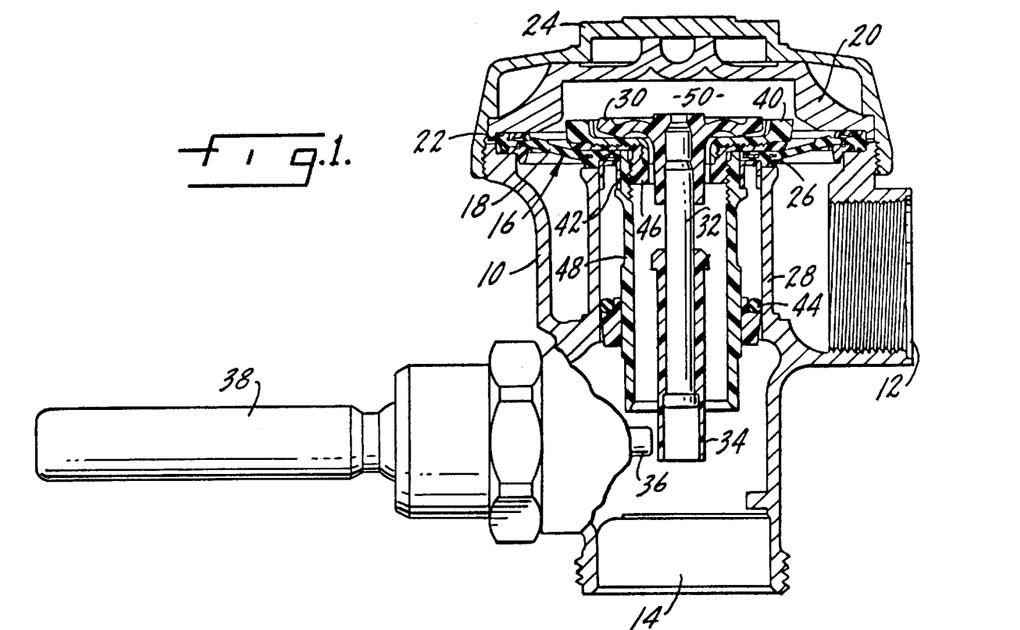
FIG. 1 is a side view, in part section, illustrating the flush valve of the present invention.

The flush valve assembly is illustrated in FIG. 1 and is of the type manufactured by the assignee of the present application, Sloan Valve Company of Franklin Park, Ill., under the trademark ROYAL. The flush valve includes a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screw threaded onto the body to hold the inner cover in position.

The invention herein relates specifically to the diaphragm assembly and has application to a ROYAL brand flush valve and to solenoid-operated flush valves such as the OPTIMA brand flush valve sold by Sloan Valve Company, as well as other types of valves requiring a diaphragm assembly of the type shown as a valve mechanism.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly 16 includes a relief valve 30 having a downwardly extending stem 32 carrying a movable sleeve 34. Sleeve 34 is positioned for contact by a plunger 36 when operated by a handle 38 as is conventional in the operation of flush valves of the type described.

The diaphragm assembly 16, in addition to diaphragm 18 and the relief valve 30 includes a retaining disk 40, a refill ring 42 and a flow control ring 44. The underside of the retaining disk 40 is threadedly attached to a collar 46 which in turn is threadedly attached at its exterior to a sleeve 48 which carries the refill ring 42. The above described assembly of elements firmly holds the diaphragm 18 between the upper face of the refill ring and a lower facing surface of the collar 46.

As is known in the art, when the handle 38 is operated, the plunger 36 will contact sleeve 34, lifting the relief valve 30 off of its seat on the retaining disk 40. This will permit the discharge of water within the pressure chamber 50 down through the sleeve 48. Inlet pressure will then cause the diaphragm to move upwardly off of its seat 26 permitting direct communication between the inlet 12 and the outlet 14 through the space between the bottom of the diaphragm assembly and the seat 26. As soon as this operation has taken place, the pressure chamber 50 will begin to fill through the to be described filter and bypass orifice in the diaphragm. As flow continues into the pressure chamber 50, the diaphragm assembly will move toward its valve seat and when it has reached that position the flush valve will be in a closed position. It is important that the time period for which the flush valve is open be tightly controlled so that the volume of water which passes through the valve in a single flushing operation can be held to the close tolerances required by the various state and federal regulations in place at the present time.

Figure 2:
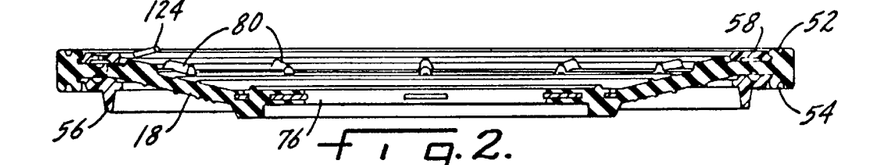
FIG. 2 is an enlarged vertical section through the flush valve diaphragm.

FIG. 2 shows the diaphragm 18 and its component parts forming a first embodiment of the invention. In all embodiments, the diaphragm per se is the same of very similar. It is essentially the rings which are associated with the diaphragm which may vary from one embodiment to another. In FIG. 2, focusing at the periphery of the diaphragm, it should be noted that the exterior periphery has upper and lower facing grooves 52 and 54 which define a pair of upper and lower facing sealing areas with the spaced sealing areas providing, in effect, four independent seals between the diaphragm and the shoulder of the flush valve body and the sealing surface of the inner cover 20.

Figure 3:
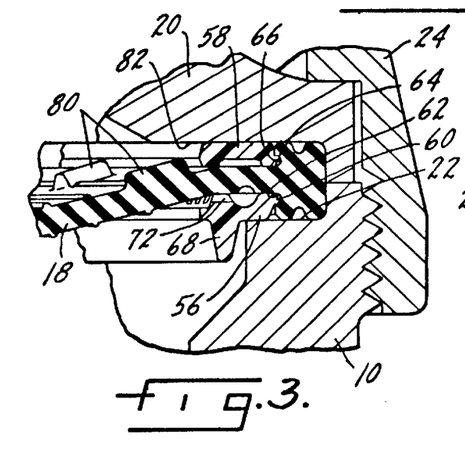
FIG. 3 is an enlarged partial section illustrating the attachment of the periphery of the diaphragm to the flush valve body.
Figure 4:
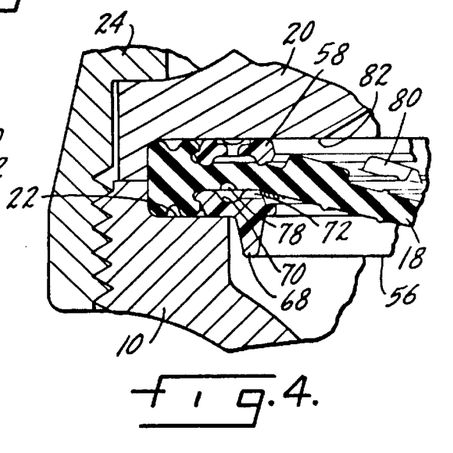
FIG. 4 is an enlarged section, similar to FIG. 3, illustrating the orifice in the diaphragm assembly.
Figures 14, 24, 25:
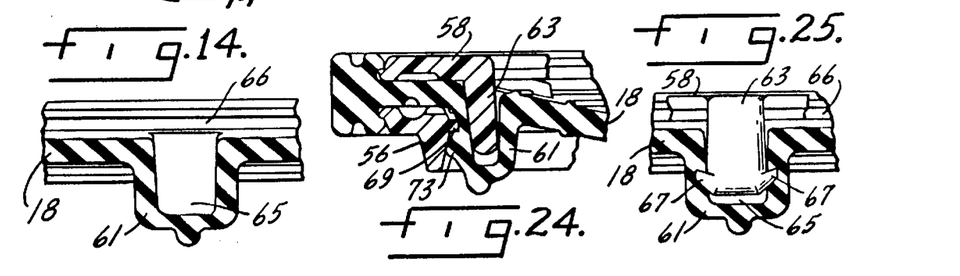
FIG. 14 is an enlarged section along plane 14—14 of FIG. 13.
FIG. 24 is an enlarged section illustrating the relative positions of the filter ring, orifice member and diaphragm at a locking tab location.
FIG. 25 is an interior view of a locking tab and the diaphragm.

The diaphragm of FIG. 2 includes a filter ring 56 attached to the bottom of the rubber diaphragm 18 and a bypass orifice member 58 attached to the upper surface. As shown specifically in FIGS. 3 and 4, the lower ring 56 has an outwardly directed projection 60 which fits within an interlocking groove 62 in the lower portion of the diaphragm 18 to thereby attach the filter ring to the diaphragm. In like manner, the orifice member 58 has an outwardly directed projection 64 fitting within a peripheral groove 66 of the upper portion of the diaphragm 18 so as to interlock the orifice member 58 to the diaphragm 18. To further secure the orifice member 58 to the diaphragm, the diaphragm has a plurality, in this case three, downwardly-extending hollow projections 61, shown in FIGS. 12, 13, 14, 24 and 25. The hollow projections 61 will each receive a locking tab 63 which extends downwardly from the orifice ring into the hollow interior 65 of the projections 61. Each of the projections 63 of the orifice member has outwardly extending barbs 67 which will embed themselves into the rubber material of the diaphragm, as particularly shown in FIG. 25, to firmly attach the orifice member to the diaphragm. This attachment between the orifice member and the diaphragm also affects the attachment of the filter ring to the diaphragm, as particularly shown in FIG. 24. The rubber of the diaphragm is squeezed between an inwardly-extending bead 69 on the filter ring and the projections 63 of the locking tab. Further, each of the projections 61 has an outwardly extending bead 73 which prevents downward removal of the filter ring. This relationship is shown particularly in FIG. 24. Thus, both of the rings are secured to the diaphragm by an interlocking mechanism which resists their removal. Both of the elements which cooperate with the rubber diaphragm, which elements may be formed of a suitable plastic, can be snapped into place onto the rubber diaphragm during assembly of the diaphragm unit.

The filter ring 56, as clearly shown in FIG. 2, is located closely adjacent to the outer periphery of the diaphragm, and, in fact, just inside of the points of seal of the diaphragm to the flush valve body. The ring 56 includes an axial extension 68 and an upwardly facing channel 70 which has spaced ribs 71 which interrupt the flow path allowing solid particles which have come through grooves 72 to settle. The upper interior surface of ring 56 has a plurality of uniformly spaced grooves 72 of consistent size. These grooves which, as shown particularly in FIGS. 28–31, face toward the interior of the diaphragm and provide the means for filtering water which is to flow through the diaphragm to the pressure chamber. It is important that the size of the grooves 72 be smaller than the bypass orifice in the orifice member so that they may validly perform their filtering function. As a specific example of one type of filter ring, there may be 180 grooves, although the invention should not be so limited. The axial extension 68 is important for the filter ring as it helps to guide the assembly into the flush valve body 10 and provides stiffening support for the filter ring to accommodate the axial load applied thereto during operation.

The diaphragm 18 is shown in detail in FIGS. 5–14 and includes a central opening 76, as is conventional, and the above described peripheral seals. The lower surface of the diaphragm, adjacent its periphery, has a circumferential channel 78 which is in alignment with the channel 70 in the filter ring, as particularly shown in FIG. 4. Thus, water flowing through the grooves 72 will then flow through the passage formed by the aligned and facing channels 70 and 78 on the underside of the diaphragm. The upper surface of the diaphragm may have a plurality of upwardly facing lugs 80. The lugs 80 allow water from the bypass orifice to be described to reach the entire upper pressure chamber 50 as when the diaphragm is raised up from its seat, the lugs will contact the underside 82 (FIG. 3) of the inner cover and the spaces therebetween will provide a path of water flow even when the diaphragm is in the upper or raised position. The bypass passage in the diaphragm is shown specifically in section in FIG. 7. There are two openings 84 and 86 with a spacer 87 therebetween. The openings 84 and 86 are in communication on the top by a groove 88 and are in communication with a lower downwardly facing recess 78 which connects both of the openings with the total circumference of the diaphragm. Note that the spacer 87 does not reach the full height of the diaphragm and this relieved area forces the water to turn when flowing to the orifice opening in the upper ring to be described which turning reduces water velocity through the slots. Further, the spaced openings in the diaphragm, in effect, form a secondary filter and are also used to align the orifice ring with the diaphragm during the assembly process.

Figure 5:
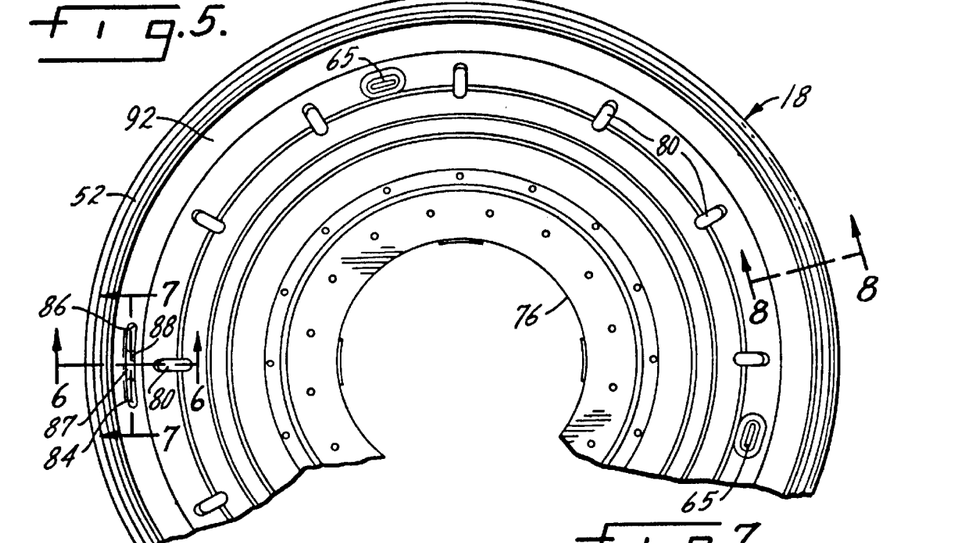
FIG. 5 is a partial enlarged top view of the diaphragm.
Figures 6, 7, 8, 9, 10, 11:
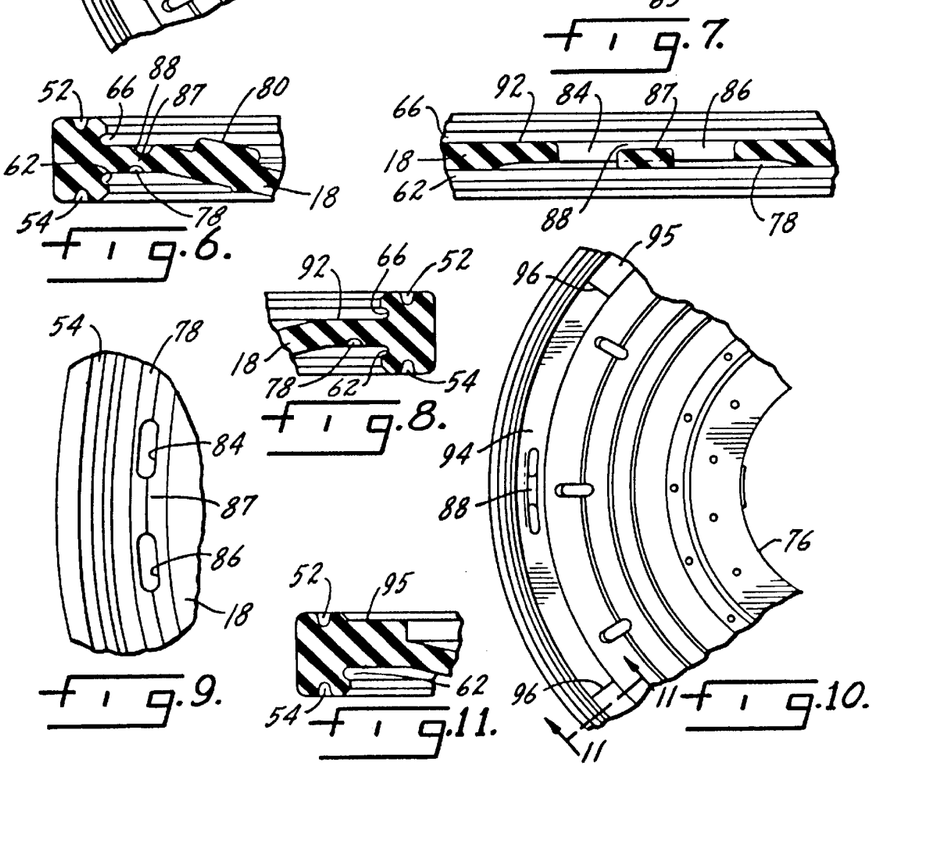
FIG. 6 is a section along plane 6—6 of FIG. 5.
FIG. 7 is a section along plane 7—7 of FIG. 5.
FIG. 8 is a section along plane 8—8 of FIG. 5.
FIG. 9 is an enlarged partial bottom view illustrating the diaphragm bypass orifice openings.
FIG. 10 is an enlarged partial top view of a second embodiment of the diaphragm.
FIG. 11 is a section along plane 11—11 of FIG. 10.
Figures 12, 13, 22, 23:
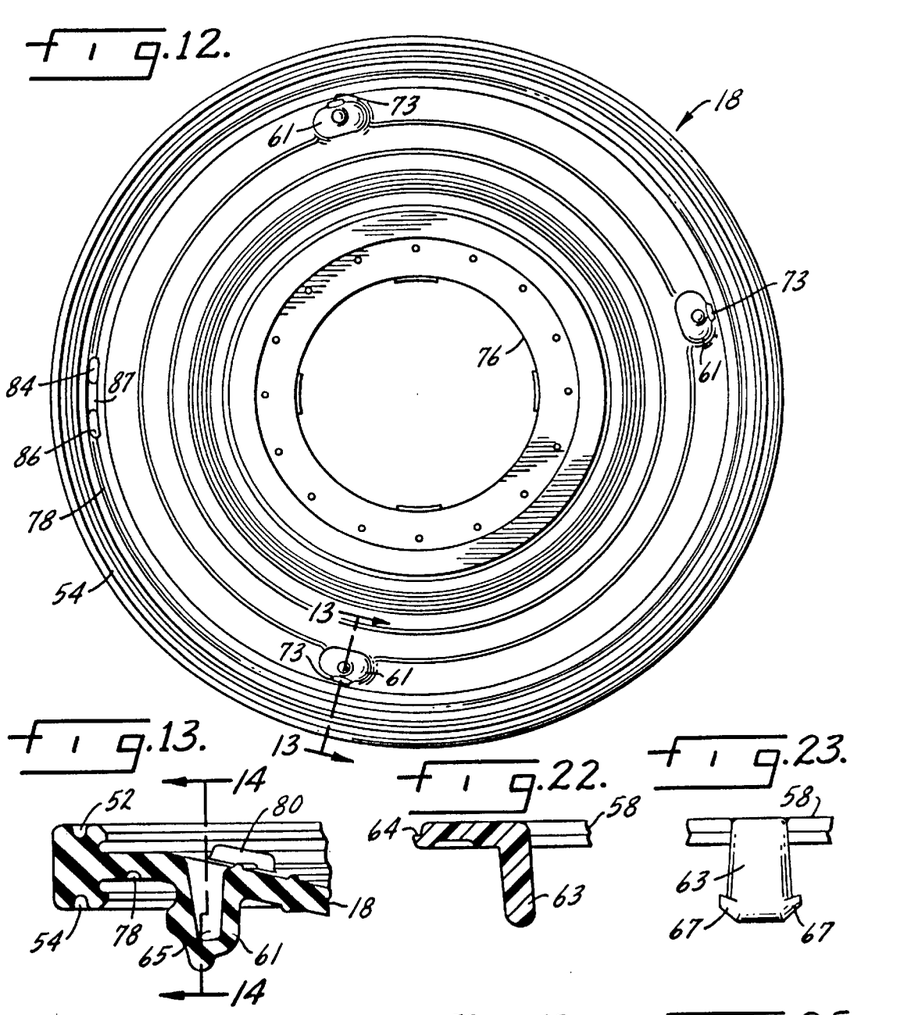
FIG. 12 is a bottom view of the diaphragm.
FIG. 13 is an enlarged section along plane 13—13 of FIG. 12.
FIG. 22 is a section along plane 22—22 of FIG. 15.
FIG. 23 is an inside view of the locking tab shown in FIG. 22.
Figures 16, 17, 18, 19, 20, 21:
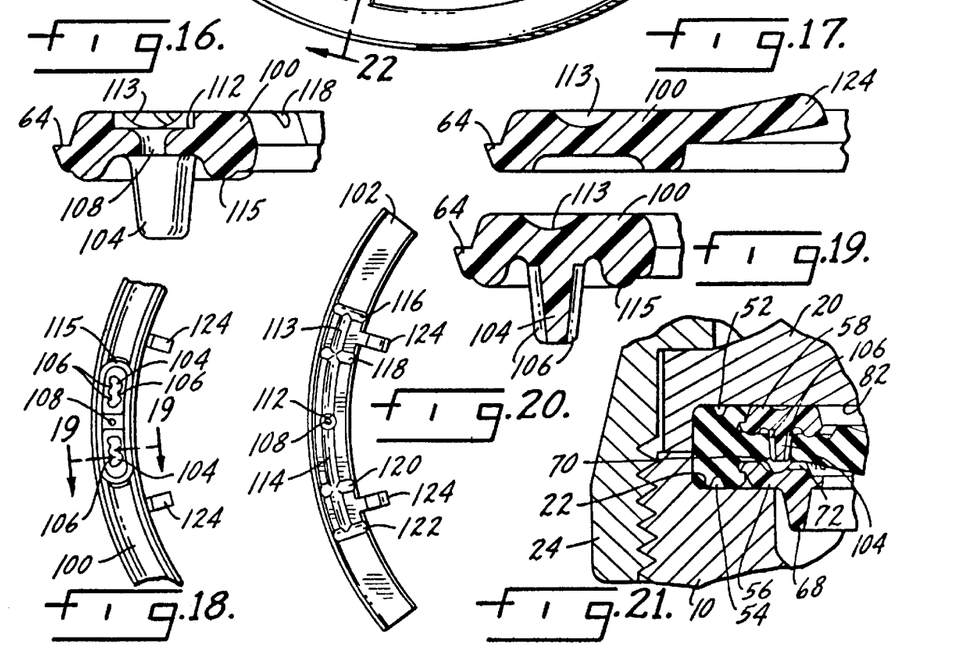
FIG. 16 is an enlarged section along plane 16—16 of FIG. 15.
FIG. 17 is an enlarged section along plane 17—17 of FIG. 15.
FIG. 18 is a partial bottom view of the orifice ring.
FIG. 19 is an enlarged section along plane 19—19 of FIG. 18.
FIG. 20 is a top view of a second embodiment of orifice member used with the diaphragm of FIG. 10.
FIG. 21 is an enlarged partial section illustrating the cooperation between the orifice member and the filter ring.

FIG. 5 shows a diaphragm which may be used with an orifice member which is 360 in circumference. FIG. 10 shows a portion of the diaphragm 18 designed for use with an orifice member of lesser arcuate extent such as shown in FIG. 20. There is a peripheral recess 92 in the diaphragm 18 as shown in FIG. 5 and this recess extends through the 360° circumference of the diaphragm. This same recess is shown at 94 in FIG. 10 and has end walls 96 which define its arcuate extent. The orifice member of FIG. 20 only fits within the recess 94 and hence the remaining circumference of the upper surface of the diaphragm has been filled in by rubber, as at 95 in FIG. 11, when the diaphragm is initially molded.

Figure 15:
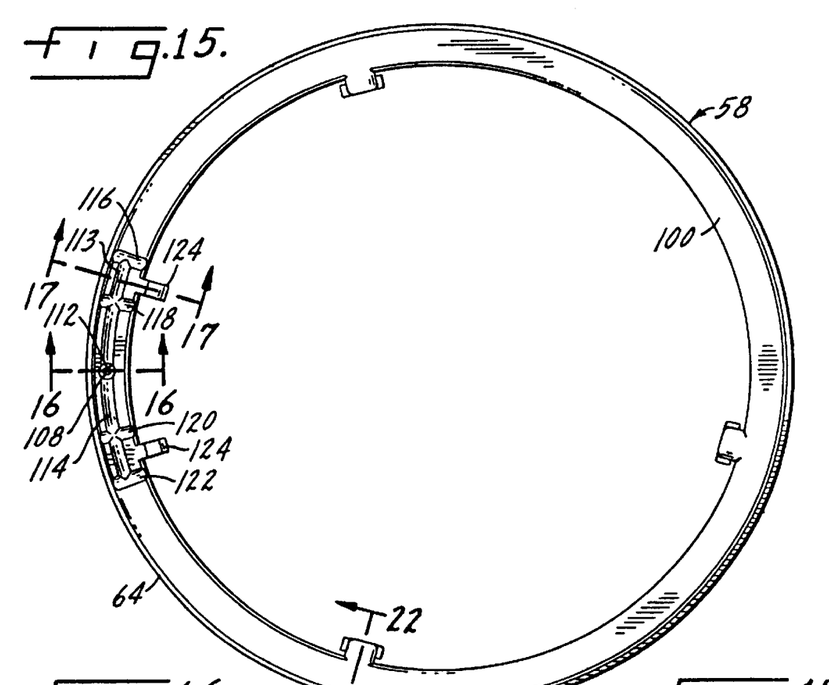
FIG. 15 is a top view of the orifice ring.
Figure 26:
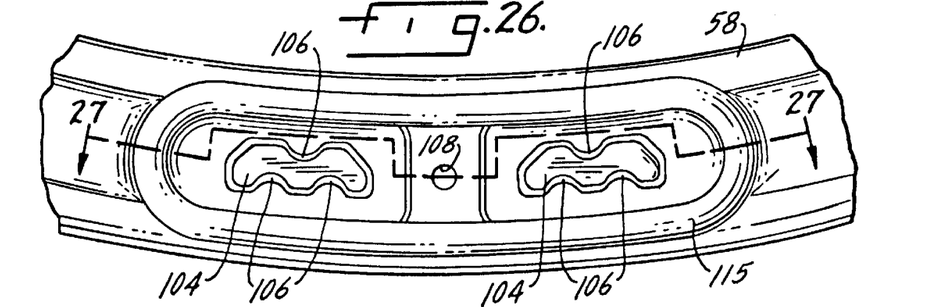
FIG. 26 is an enlarged bottom view of a portion of the orifice member.
Figure 27:
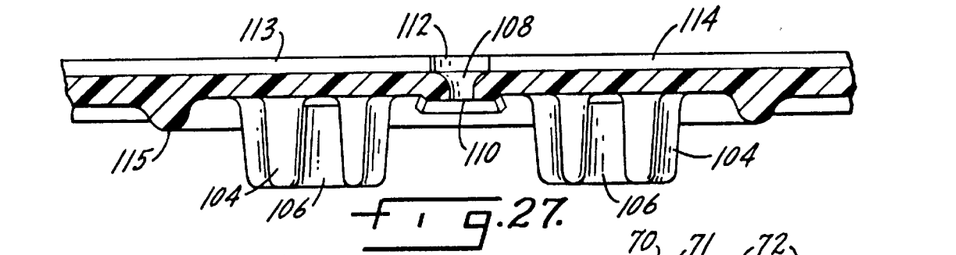
FIG. 27 is a section along plane 27—27 of FIG. 26.
Figures 28, 30, 31:
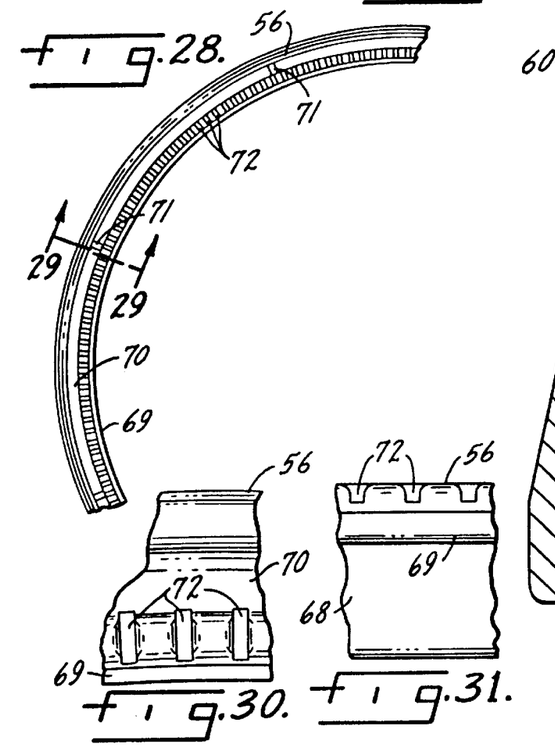
FIG. 28 is a partial top view of the filter ring.
FIG. 30 is an enlarged partial top view of the filter ring.
FIG. 31 is an enlarged partial side view, from the inside of the filter ring.
Figure 29:
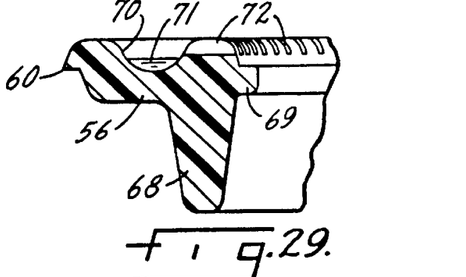
FIG. 29 is a section along plane 29—29 of FIG. 28.

The orifice member, in both complete ring and arcuate segment forms, is detailed in FIGS. 15–27. The member includes an annular body 100 which is completely circumferential as shown in FIG. 15 and which may be of limited arcuate extent in the embodiment shown in FIG. 20 and given the reference numeral 102. That portion of the orifice member or orifice ring which cooperates with the bypass passage in the diaphragm is of particular significance. As shown specifically in the section of FIG. 27, the orifice ring has a pair of downwardly extending projections 104 which will extend into the diaphragm orifice openings as shown in FIG. 21. Each of the projections 104 has a plurality of axially extending recesses 106, as shown in FIG. 26, which form water passages between the body of the projections and the wall of the recesses 84 and 86 in the diaphragm. It is through these passages that water flows through the diaphragm and the effect of the recesses is to provide a secondary filter, in series with the primary filter in the filter ring. The water will flow through the described recesses 106 to reach the underside of the orifice ring at a location midway between the projections 104 and in alignment with a bypass orifice opening 108. This is shown in FIGS. 16, 18, 20, 26 and 27. The opening 108 is funnel shaped, with the small end being upstream, as at 110 and the larger end being at the downstream end and opening into an enlarged area 112, as shown in FIG. 27. The enlarged area of the orifice reduces water velocity which has the result of reducing pressure loss. The orifice is funnel shaped so that a particle which can enter the orifice is guaranteed to pass through it because the cross sectional area of the orifice gets progressively larger. Once water has passed through the orifice 108 and reached the upper surface of the orifice ring 100, in either of the two orifice ring embodiments, the water will pass into two oppositely directed circumferentially extending channels 113 and 114 which are formed in the upper surface of the orifice ring. These channels open into radially extending channels 116, 118, 120 and 122. This assures that water passing through the orifice 108 has alternate venting paths so as to keep pressure loss to a minimum, thus assuring prompt refilling of the pressure chamber.

The orifice ring 100 further includes, in both embodiments, a sealing bead 115 on its lower surface which cooperates with the elastomeric diaphragm to insure that water only reaches the pressure chamber through the bypass orifice. The rings 100 and 102 also include a pair of inwardly radially extending locating tabs 124 which may be used in assembly of the diaphragm to properly locate the orifice ring, in either full form or segment form, over the bypass orifice openings 84 and 86 in the diaphragm 18. The tabs are located an equal distance from the opening 108 and thus provide for ease of assembly of the described elements.

Figure 32:
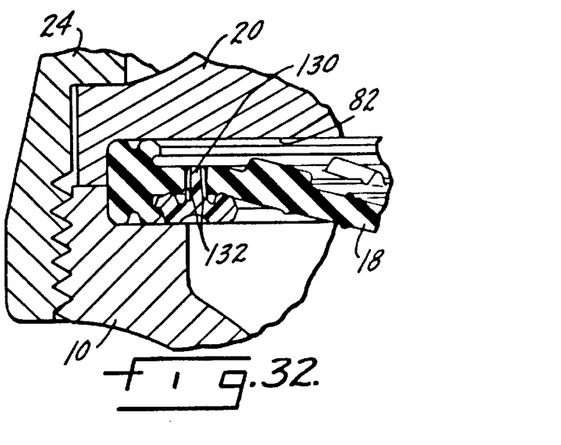
FIG. 32 is an enlarged partial vertical section showing a third embodiment of the invention.
Figure 33:
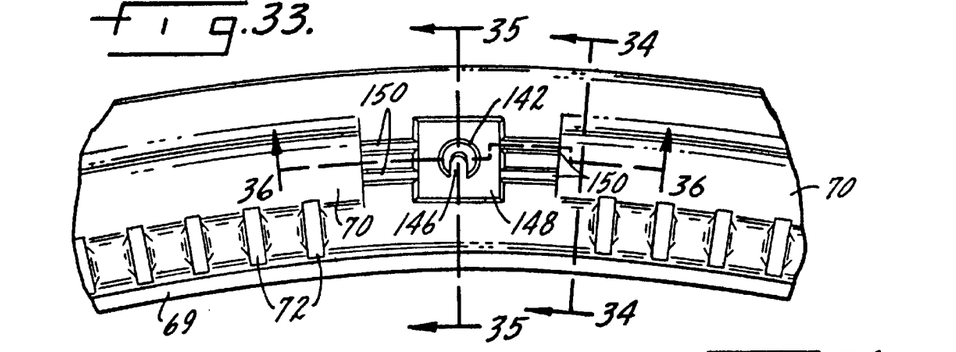
FIG. 33 is an enlarged bottom view of a further embodiment of the filter ring.
Figure 34:
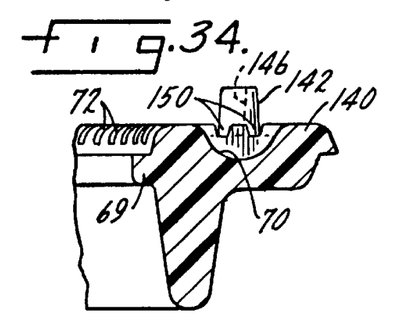
FIG. 34 is a section along plane 34—34 of FIG. 33.
Figure 35:
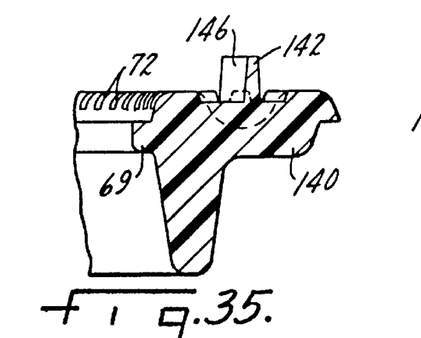
FIG. 35 is a section along plane 35—35 of FIG. 33.
Figure 36:
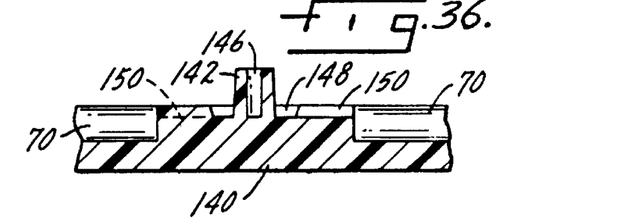
FIG. 36 is a section along plane 36—36 of FIG. 33.

In the first two described embodiments, the principal difference is that the orifice ring is either 360° in circumference or is of a limited arcuate extent. The cooperation, however, between the orifice member and the diaphragm, and its construction adjacent the bypass orifice openings in the diaphragm, is the same. In a third embodiment, shown specifically in FIG. 32, the bottom filter ring also functions as the orifice member. In this instance, that portion of the filter ring which is adjacent the bypass orifices, will have the same construction as illustrated in FIGS. 26 and 27. Thus, as shown in FIG. 32, the filter ring may have a pair of upwardly extending projections 130, with axially extending grooves or recesses 132 to provide the water paths through the diaphragm bypass openings. The function of the elements will be the same with the difference being that the filter ring provides two functions. The same single ring could also perform the same two functions from the top of the diaphragm.

Figure 37:
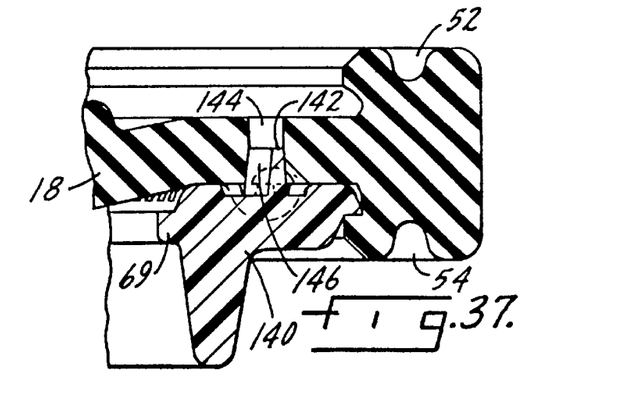
FIG. 37 shows the filter ring of FIG. 33 attached to the diaphragm.
Figure 38:
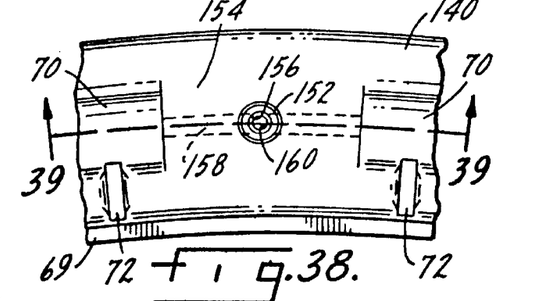
FIG. 38 is an enlarged bottom view of yet a further embodiment of filter ring.
Figure 39:
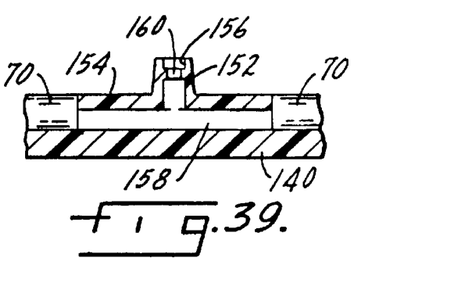
FIG. 39 is a section along plane 39—39 of FIG. 38.

Two further embodiments of a filter ring which also functions as the orifice member are shown in FIGS. 33–39. In the embodiments of FIGS. 33–37, a filter ring 140 has an upwardly-facing projection 142, which will extend into an opening 144 in the diaphragm, as shown in FIG. 37. The projection 142 has a groove 146 on one side thereof which is in communication with a recess 148 formed in the upper surface of ring 140. The recess 148 is connected, on both sides thereof, by a pair of passages 150 to the circumferential groove 70 in the upper surface of the filter ring. Thus, water reaching the groove 70 through the filter passages 72 will pass through the passages 150, into the recess 148, upwardly through the groove 146 and into the pressure chamber above the diaphragm. In this instance, the size of the groove 146 provides the bypass orifice function. The passages 150 may perform a secondary filtering operation with the primary filter again being the grooves 72 in the filter ring 140.

In the embodiment shown in FIGS. 38 and 39, again the filter ring also provides a bypass function. In this instance there is a projection 152 which will extend upwardly from the top surface of the filter ring 154 and into an opening in the diaphragm similar to the opening 144 shown in FIG. 37. The projection 152 has an interior multi-diametered bore 156, the lower portion of which is connected to a passage 158 which in turn connects with the circumferential groove 72 in the upper surface of the filter ring. Again, water reaching the groove 70 through the filter passages 72 will flow into the passage 158 and then upwardly through the multi-diametered bore 156. It is important to note that there is a reduced diameter portion 160 in bore 156 which functions as the bypass orifice. The primary filter will again be the groove 72, the passage 158 and the lower portion of bore 156 can also provide a filtering function, with the bypass orifice itself being determined by the size of that portion 160 of the bore 156.

The present invention provides a substantially improved diaphragm assembly with a filter and bypass for the diaphragm located at or adjacent the periphery of the diaphragm. This is the preferred location as it provides a filter of substantially increased circumferential extent, a greater number of filter grooves and, thus, assurance that there will always be filter passages for the water, even if some of the grooves become clogged with sediment or other particles within the potable water. The filter is formed by a ring having a plurality of grooves sized to be smaller than the openings in the bypass orifice. There is a secondary filter formed at the bypass orifice by the use of the recessed projections which may be either on the orifice member or on the filter ring, as illustrated in the third embodiment. The two plastic rings are easily snapped into the diaphragm, and, once attached, provide the above described water flow passages insuring a clear flow of water from the flush valve inlet, through the primary filter, the secondary filter and the bypass orifices to the flush valve pressure chamber. The assembly provides controlled flow of water to the pressure chamber which insures consistent closure of the flush valve after operation.

Whereas the preferred form of the invention has been shown and described herein, it should be realized that there may be many modifications, substitutions and alterations thereto.

The embodiments of the invention in which an exclusive property or privilege is claimed are defined as follows:

1. A diaphragm-type valve including a body having an inlet and an outlet, a valve seat between said inlet and outlet and a valve member movable to a closing position on said valve seat to stop flow between said inlet and outlet, said valve member including a diaphragm peripherally attached to said body, a pressure chamber above said diaphragm for holding said valve member on said valve seat, a filter and bypass orifice connecting said inlet and pressure chamber, said filter including a circumferential filter ring attached to said diaphragm and positioned adjacent the periphery of said diaphragm at the peripheral attachment of diaphragm to said body, said ring having a plurality of circumferentially spaced filter grooves in communication with said inlet, a peripheral channel connecting said grooves, and an orifice in communication with said peripheral channel and said plurality of grooves.

2. The valve of claim 1 wherein said ring is attached to the underside of said diaphragm and said orifice is located in said ring.

3. The valve of claim 1 wherein said filter ring is attached to the underside of said diaphragm, and including an orifice member attached to the pressure chamber side of said diaphragm, said orifice being in said orifice member.

4. A diaphragm-type flush valve for use with toilet devices such as urinals and water closets including a body having an inlet and an outlet, a valve seat between said inlet and outlet and a valve member movable to a closing position on said valve seat to stop flow between said inlet and outlet, said valve member including a diaphragm peripherally attached to said body between facing clamping surfaces thereof, a pressure chamber above said diaphragm for holding said valve member on said valve seat, a filter and bypass orifice connecting said inlet and pressure chamber, said filter including a circumferential filter ring attached to the underside of said diaphragm and positioned adjacent the periphery of said diaphragm, said ring being held to said diaphragm, at least in part, by said body clamping surfaces, said ring having a plurality of circumferentially spaced filter grooves in communication with said inlet, a peripheral channel connecting said grooves, and an orifice in communication with said peripheral channel and said plurality of grooves.

5. The flush valve of claim 4 wherein said peripheral channel includes a peripheral slot in said filter ring facing said diaphragm.

6. The flush valve of claim 4 wherein said peripheral channel includes a peripheral slot in said ring facing said diaphragm and a peripheral slot in said diaphragm facing said ring, said peripheral slots being generally in alignment.

7. The flush valve of claim 4 wherein each of said filter grooves is smaller than said orifice.

8. The flush valve of claim 4 wherein said diaphragm includes spaced openings connected by a recess on the underside of said diaphragm.

9. The flush valve of claim 8 including an orifice member attached to the pressure chamber side of said diaphragm and having a portion thereof extending into said diaphragm spaced openings.

10. The flush valve of claim 9 wherein said orifice member has a plurality of radially inwardly extending locating tabs.

11. The flush valve of claim 9 wherein said orifice member is a ring.

12. The flush valve of claim 9 wherein said orifice member is arcuate, extending for a limited extent, on each side of said diaphragm openings.

13. The flush valve of claim 9 wherein said orifice member has projections extending into each diaphragm opening.

14. The flush valve of claim 13 wherein the orifice is in said orifice member and is in communication with said diaphragm openings.

15. The flush valve of claim 14 wherein said orifice is funnel shaped, with the smaller end thereof being at the upstream end of said orifice.

16. The flush valve of claim 14 wherein each of said orifice member projections have at least one recess forming water passages between said diaphragm openings and said orifice.

17. The flush valve of claim 16 wherein said orifice member projection recesses form water passages functioning as a filter upstream of said orifice.

18. The flush valve of claim 17 wherein said orifice member includes a plurality of grooves on the pressure chamber side of said orifice member and connecting said orifice with said pressure chamber.

19. The flush valve of claim 18 wherein said grooves extend both radially and circumferentially.

20. The flush valve of claim 12 including a sealing bead on said orifice member surrounding said projections and in sealing contact with said diaphragm.

21. The flush valve of claim 8 wherein said filter ring has projections extending into each of said diaphragm openings.

22. The flush valve of claim 21 wherein each of said filter ring projections have at least one recess forming water passages between said filter ring passages and said diaphragm openings.

23. The flush valve of claim 4 wherein said filter ring includes said orifice.

24. The flush valve of claim 23 wherein said filter ring includes a projection extending into an opening in said diaphragm, with said orifice being associated with said projection.

25. The flush valve of claim 24 wherein said orifice is formed by a bore in said filter ring projection.

26. The flush valve of claim 24 wherein said orifice is formed by an exterior recess on said projection.

27. A valve member assembly for use in a toilet device flush valve for closing upon a seat thereof including a diaphragm said diaphragm having an upper and a lower peripheral sealing surface for use in mounting a valve assembly within a toilet device flush valve, a filter and bypass orifice in said valve member assembly for connecting the inlet of a flush valve and a pressure chamber in the flush valve, said filter including a circumferential filter ring attached to the underside of said diaphragm and positioned directly adjacent the lower peripheral sealing surface of said diaphragm, said ring having a plurality of circumferentially spaced filter grooves adapted to be in communication with the flush valve inlet, a peripheral channel connecting said grooves, and an opening in said diaphragm in communication with said peripheral channel and said plurality of grooves.

28. The valve member assembly of claim 27 wherein said peripheral channel includes a peripheral slot in said filter ring facing said diaphragm.

29. The valve member assembly of claim 27 wherein said peripheral channel includes a peripheral slot in said ring facing said diaphragm and a peripheral slot in said diaphragm facing said ring, said peripheral slots being generally in alignment.

30. The valve member assembly of claim 27 wherein said diaphragm includes spaced openings connected by a recess on the underside of said diaphragm.

31. The valve member assembly of claim 30 wherein said filter ring has projections extending into each of said diaphragm orifice openings.

32. The valve member assembly of claim 31 wherein each of said filter ring projections have at least one recess forming water passages between said filter ring passages and said diaphragm openings.

33. The valve member assembly of claim 30 including an orifice member attached to the pressure chamber side of said diaphragm and having a portion thereof extending into said diaphragm spaced openings.

34. The valve member assembly of claim 33 wherein said orifice member is a ring.

35. The valve member assembly of claim 33 wherein said orifice member is arcuate, extending for a limited extent, on each side of said diaphragm openings.

36. The valve member assembly of claim 33 wherein said orifice member has projections extending into each diaphragm opening.

37. The valve member assembly of claim 36 including a sealing bead on said orifice member surrounding said projections and in sealing contact with said diaphragm.

38. The valve member assembly of claim 36 wherein there is an orifice in said orifice member in communication with said diaphragm openings.

39. The valve member assembly of claim 38 wherein said orifice is funnel shaped, with the smaller end thereof being at the upstream end of said orifice.

40. The valve member assembly of claim 38 wherein each of said orifice member projections have at least one recess forming water passages between said diaphragm openings and said orifice.

41. The valve member assembly of claim 40 wherein said orifice member projection recesses form water passages functioning as a filter upstream of said orifice.

42. The valve member assembly of claim 41 wherein said orifice member includes a plurality of grooves on the pressure chamber side of said orifice member and connecting said orifice with the pressure chamber.

43. The valve member assembly of claim 42 wherein said grooves extend both radially and circumferentially.

* * * * *